(12) United States Patent
Zhao et al.

(10) Patent No.: US 11,110,384 B1
(45) Date of Patent: Sep. 7, 2021

(54) CHEMICAL CATALYSIS MODULE

(71) Applicant: HBOS ENVIRONMENTAL ENGINEERING (SHANGHAI) CO., LTD., Shanghai (CN)

(72) Inventors: Feng Zhao, Shanghai (CN); Jianjun Wu, Shanghai (CN); William Hall, Shanghai (CN)

(73) Assignee: HBOS ENVIRONMENTAL ENGINEERING (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 17/321,596

(22) Filed: May 17, 2021

(30) Foreign Application Priority Data

Jul. 17, 2020 (CN) .......................... 202010690073.3

(51) Int. Cl.
*B01D 53/02* (2006.01)
*B01D 53/04* (2006.01)
*B01D 53/88* (2006.01)
*B01J 20/28* (2006.01)
*B01J 20/26* (2006.01)

(52) U.S. Cl.
CPC ......... *B01D 53/0407* (2013.01); *B01D 53/88* (2013.01); *B01J 20/261* (2013.01); *B01J 20/262* (2013.01); *B01J 20/28045* (2013.01); *B01D 2253/11* (2013.01); *B01D 2253/304* (2013.01)

(58) Field of Classification Search
CPC ................ B01D 53/0407; B01D 53/88; B01D 2253/11; B01D 2253/304; B01J 20/261; B01J 20/262; B01J 20/28045
See application file for complete search history.

(56) References Cited

U.S. PATENT DOCUMENTS

| | | | | |
|---|---|---|---|---|
| 5,288,306 | A * | 2/1994 | Aibe ...................... | B01D 53/02 95/141 |
| 2003/0042197 | A1 * | 3/2003 | Kondou ................... | B01J 20/30 210/502.1 |
| 2009/0229555 | A1 * | 9/2009 | Ginzburg .............. | F17C 11/005 123/1 A |

(Continued)

FOREIGN PATENT DOCUMENTS

| CN | 206483341 U | 9/2017 |
|---|---|---|
| CN | 209221837 U | 8/2019 |

*Primary Examiner* — Christopher P Jones
(74) *Attorney, Agent, or Firm* — Bayramoglu Law Offices LLC

(57) ABSTRACT

A chemical catalysis module is disclosed. The chemical catalysis module includes adsorption cubes for adsorbing a chemical gas. The chemical catalysis module further includes a frame structure for accommodating the adsorption cubes. The frame structure includes two oppositely arranged semi-cells. Each of the semi-cells is uniformly provided with a plurality of cavity structures. Each of the cavity structures is embedded with the adsorption cubes inside. The adsorption cubes are embedded in each of the cavity structures in a single or array manner. One half of the adsorption cubes are embedded in the cavity structure of one of the semi-cells of the frame structure, and the other half of the adsorption cubes are embedded in the cavity structure of the other of the semi-cells of the frame structure. The product has sufficient strength, friction and good aerodynamic performance.

13 Claims, 5 Drawing Sheets

(56) References Cited

U.S. PATENT DOCUMENTS

| | | | |
|---|---|---|---|
| 2012/0272823 A1* | 11/2012 | Halder | B01J 20/28045 95/139 |
| 2014/0224122 A1* | 8/2014 | Wallman | B01J 20/3007 95/118 |
| 2016/0271555 A1* | 9/2016 | Hiltzik | B01D 53/0415 |
| 2017/0096335 A1* | 4/2017 | Wormser | B01D 53/047 |

* cited by examiner

CHEMICAL CATALYSIS MODULE

CROSS REFERENCE TO THE RELATED APPLICATIONS

This application is based upon and claims priority to Chinese Patent Application No. 202010690073.3, filed on Jul. 17, 2020, the entire contents of which are incorporated herein by reference.

TECHNICAL FIELD

The present invention relates to the technical field of air purification, and specifically relates to an adsorption and filtration module.

BACKGROUND

In the field of air purification, granular products such as activated carbon and alumina are typically used for chemical adsorption and filtration. This adsorption and filtration method has the disadvantages of high resistance, high energy consumption, high levels of dust and low cleanliness. In recent years, with the development of ceramic-matrix multi-element composites, there are a large number of honeycomb activated carbon-like products emerging in China. The honeycomb activated carbon-like product is made of small pieces with a cross-section of 50×50 mm to 150×150 mm, which are spliced by gluing, wrapped in a metal or plastic outer frame and added with accessories. When air flows through the product, chemical gases are captured and clean air flows out.

However, the honeycomb activated carbon-like filtration product has the following disadvantages:

1. The fragile material inside the product is directly connected to the plastic or metal wall without buffering, therefore, the product is susceptible to damage in the process of manufacturing, transportation and use. Especially in the transportation process, standard or palletless modes of delivery cannot be used because the product is likely to be damaged.

2. The glue layer blocks airflow, causing the product to lose a large number of effective airflow sites, resulting in a decrease in performance.

3. If inferior glue is used, volatile organic compounds will be produced, which will be absorbed inside the product and affect product performance.

SUMMARY

An objective of the present invention is to provide a chemical catalysis module. The present invention solves the technical problems that a glued adsorption and filtration product is inefficient, easily damaged, and readily produces volatile organic compounds (VOCs).

A chemical catalysis module is provided, including adsorption cubes for adsorbing a chemical gas, and a frame structure for accommodating the adsorption cubes. The frame structure includes two oppositely arranged semi-cells. Each of the semi-cells is uniformly provided with a plurality of cavity structures and each of the cavity structures is embedded with the adsorption cubes inside.

In the present invention, the adsorption cubes are uniformly arranged in the cavity structures of each of the semi-cells and the two semi-cells are oppositely arranged to form the frame structure, thereby providing more airflow channels. The present invention avoids a gluing method that will produce a VOC, and limits the adsorption cubes in the frame structure, realizing desired compression resistance, shock resistance and crash resistance and making the product convenient for transportation.

The cavity structure is provided with a square, circular, rectangular, hexagonal or polygonal cross section.

An inner wall of the cavity structure is provided thereon with protrusions for increasing friction.

The protrusions are made integrally with the semi-cell.

The cavity structure is an open-top structure, and positioning stoppers are provided on a bottom side of the cavity structure to position the adsorption cubes.

An inner edge of the cavity structure adopts a chamfered structure, such that the adsorption cubes are able to efficiently and conveniently enter the cavity structure without affecting fixing or mounting.

A top surface of each of the semi-cells is provided with protruding members and locking grooves, and two semi-cells are oppositely locked together after being buckled by the protruding members and the locking grooves. Thus, the product has sufficient strength, friction and good aerodynamic performance.

The semi-cell is made of an elastic expandable material, including one or more from the group consisting of:

elastic or non-elastic polyethylene or expanded polyethylene (PE/EPE), elastic or non-elastic polypropylene or expanded polypropylene (PP/EPP), non-elastic polystyrene or elastic expanded polystyrene (PS/EPS), elastic or non-elastic polyurethane (PU), elastic or non-elastic ethylene-vinyl acetate (EVA) copolymer, elastic or non-elastic urea formaldehyde (UF) plastic, and phenol formaldehyde (PF) resin.

The adsorption cubes are embedded in each of the cavity structures in a single or array manner.

One half of the adsorption cubes are embedded in the cavity structure of one of the semi-cells of the frame structure, and the other half of the adsorption cubes are embedded in the cavity structure of the other of the semi-cells of the frame structure.

In the present invention, the adsorption cube is different from a traditional honeycomb activated carbon material. The adsorption cube is a multi-element mixed solid module using a ceramic matrix. It is a porous module, and pores therein are in a shape that includes one or more from the group consisting of square, hexagon, circle and other polygons.

The chemical catalysis module is prepared by the following steps:

1) filling an elastic expandable material into a mold that is able to produce a target structure, molding at a preset temperature, and demolding to obtain the semi-cells;

2) placing one of the semi-cells upside down on a flat plate, and embedding the adsorption cubes into the cavity structures of the one of the semi-cells in a single or array manner until the positioning stoppers are reached; and 3) placing the other of the semi-cells on the top of the adsorption cubes of the one of the semi-cells placed in step 2) by fitting the protruding members into the locking grooves, and pressing down the top semi-cell such that the two semi-cells are oppositely locked to form a frame structure in which adsorption cubes are embedded.

The present invention has the following positive effects. Compared with a traditional honeycomb activated carbon material, the chemical catalysis module of the present invention has better performance, including higher adsorption capacity, higher strength, higher water resistance and higher temperature resistance. The product of the present invention has sufficient strength, friction and good aerodynamic performance. In addition, the present invention has sufficient support strength, avoiding the need to add an outer frame for use, and ensures desired cushioning performance and shock resistance.

DETAILED DESCRIPTION OF THE EMBODIMENTS

To make the technical means, creation features, objectives and effects of the present invention more comprehensible, the present invention is further described below with reference to the drawings.

Referring to FIGS. 1 to 5, a chemical catalysis module includes adsorption cubes for adsorbing a chemical gas and the frame structure 1 for accommodating the adsorption cubes.

In the present invention, the adsorption cube is different from a traditional honeycomb activated carbon material. The adsorption cube is a multi-element mixed solid module using a ceramic matrix. It is a porous module, and pores therein are in a shape that includes one or more from the group consisting of square, hexagon, circle and other polygons. Preferably, a wall thickness of the adsorption cube is 0.1-2.0 mm, and a pore density in the adsorption cube is 50-400 pores per square inch. The adsorption cube is made by preparing the ceramic matrix with 10-70% of a ceramic mixture, 10-70% of an active powder and other ingredients, and hardening at 200-1,200° C. The adsorption cube preferably adopts a rectangular parallelepiped structure. An overall size of the adsorption cube is preferably 20 mm×20 mm to 200 mm×200 mm, and a height thereof is determined according to a thickness of the frame structure 1.

Figure 1:
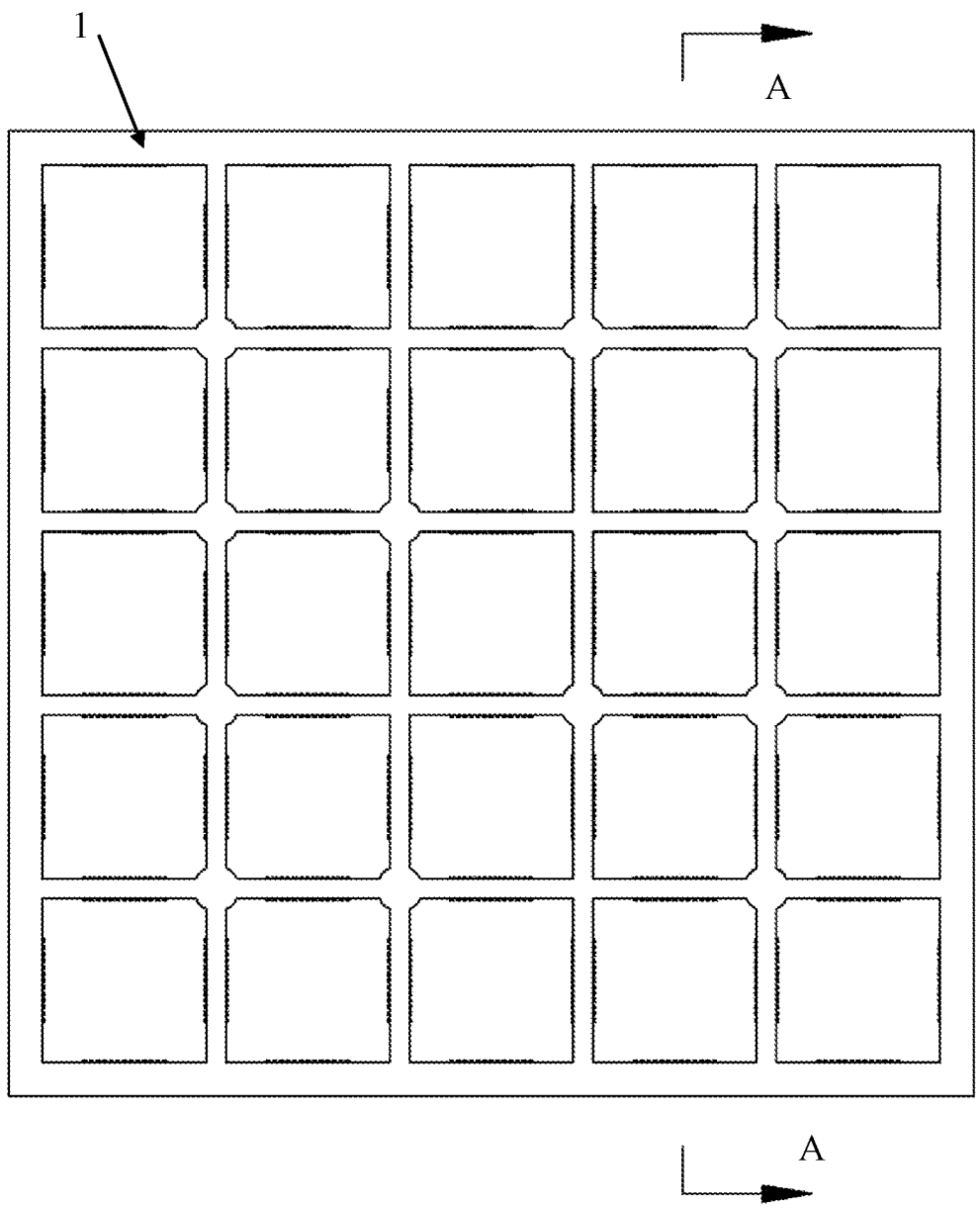
FIG. 1 is a schematic diagram showing an overall structure of the present invention.
Figure 2:
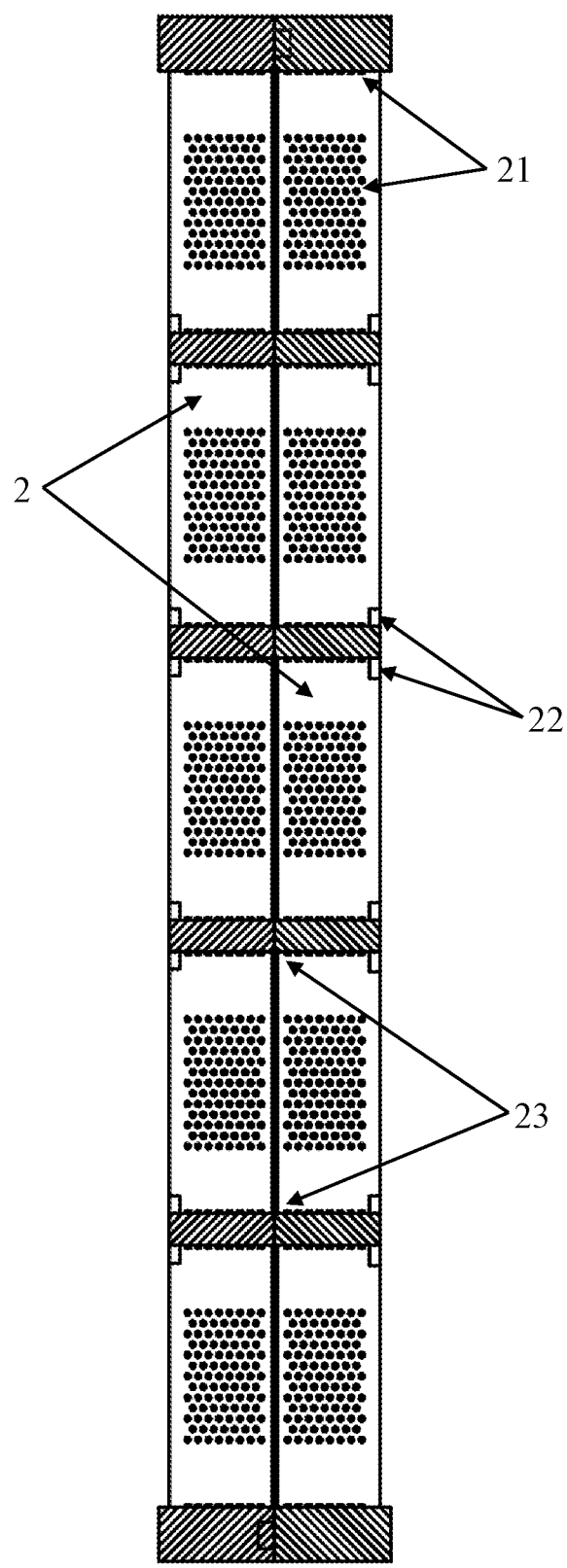
FIG. 2 is a sectional view taken along line A-A of FIG. 1.
Figure 4:
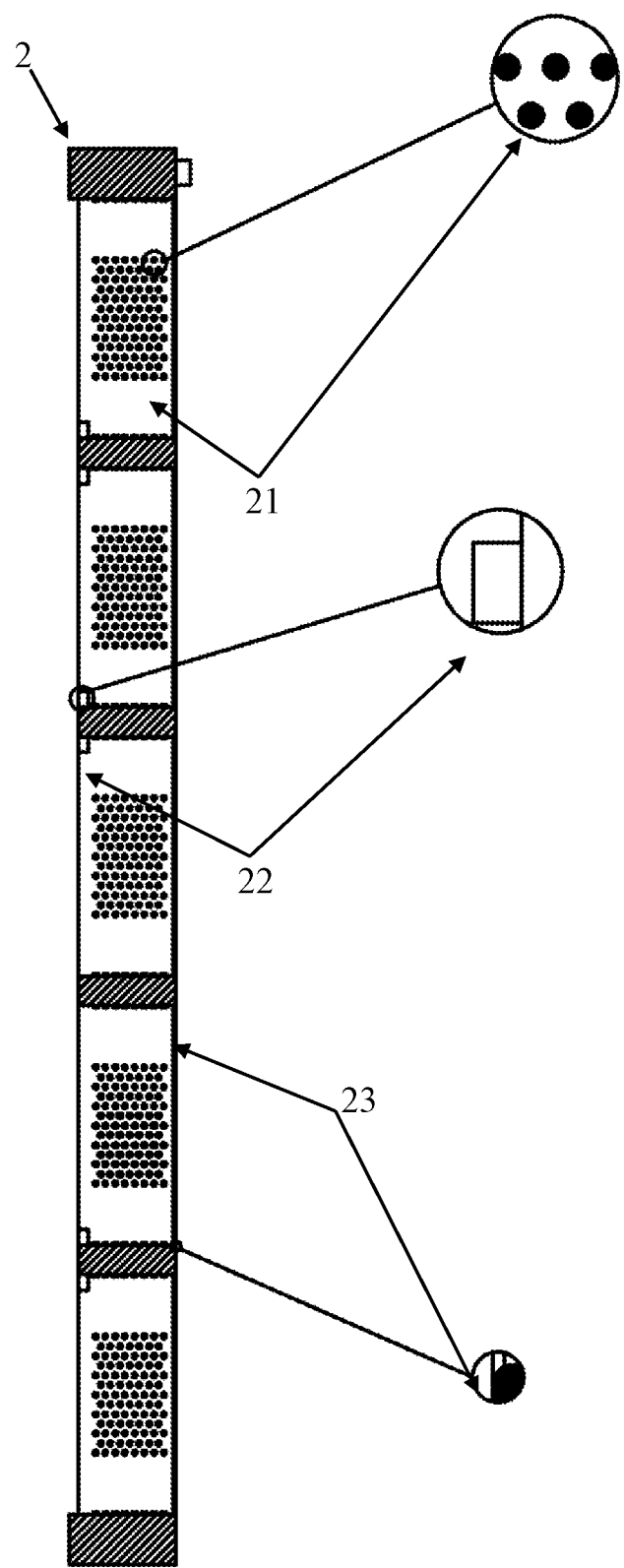
FIG. 4 is a sectional view taken along line B-B of FIG. 3.

The frame structure 1 includes two semi-cells 2 oppositely arranged, and each of the semi-cells 2 is uniformly provided with a plurality of cavity structures. The cavity structure is provided with a square, circular, rectangular, hexagonal or polygonal cross section. Preferably, there are 4-40 cavity structures provided in the semi-cells 2. As shown in FIGS. 2 and 4, the cavity structure is a rectangular parallelepiped structure with a square cross section, and there are 25 cavity structures. A spacing between the cavity structures, that is, a thickness of an inner frame, is preferably 20-50 mm. The thickness of each of the semi-cells 2 is preferably 3-50 mm.

An inner wall of the cavity structure is provided thereon with protrusions 21 for increasing friction. The protrusions 21 are made integrally with the semi-cells 2. A diameter of the protrusion 21 is preferably 0.1-2.0 mm. As shown in FIGS. 2 and 4, the protrusions 21 are provided on peripheral side walls of the cavity structures.

The cavity structure is an open-top structure, and positioning stoppers 22 are provided on a bottom side of the cavity structure. The positioning stoppers 22 serve as end-point positioning stoppers for positioning the adsorption cubes. That is, when the adsorption cubes reach the positioning stoppers, they reach an end point and no longer move. The positioning stoppers 22 can be used to secure a finished product during transportation. Each of the cavity structures is embedded with the adsorption cubes inside, and the adsorption cubes are embedded in each of the cavity structures in a single or array manner. When the adsorption cubes are placed in the two symmetrically locking semi-cells, one half of the adsorption cubes are embedded in the cavity structure of one of the semi-cells 2, and the other half of the adsorption cubes are embedded in the cavity structure of the other of the semi-cells 2. In this way, the two semi-cells 2 of the frame structure 1 serve as two half-covers of the adsorption cubes, and the adsorption cubes are locked and limited by the positioning stoppers 22.

An inner edge of the cavity structure adopts the chamfered structure 23, such that the adsorption cube is able to efficiently and conveniently enter the cavity structure without affecting fixing or mounting. As shown in FIGS. 2 and 4, the chamfered structure 23 is an R-shaped chamfered structure of 0.05-8 mm.

Figure 3:
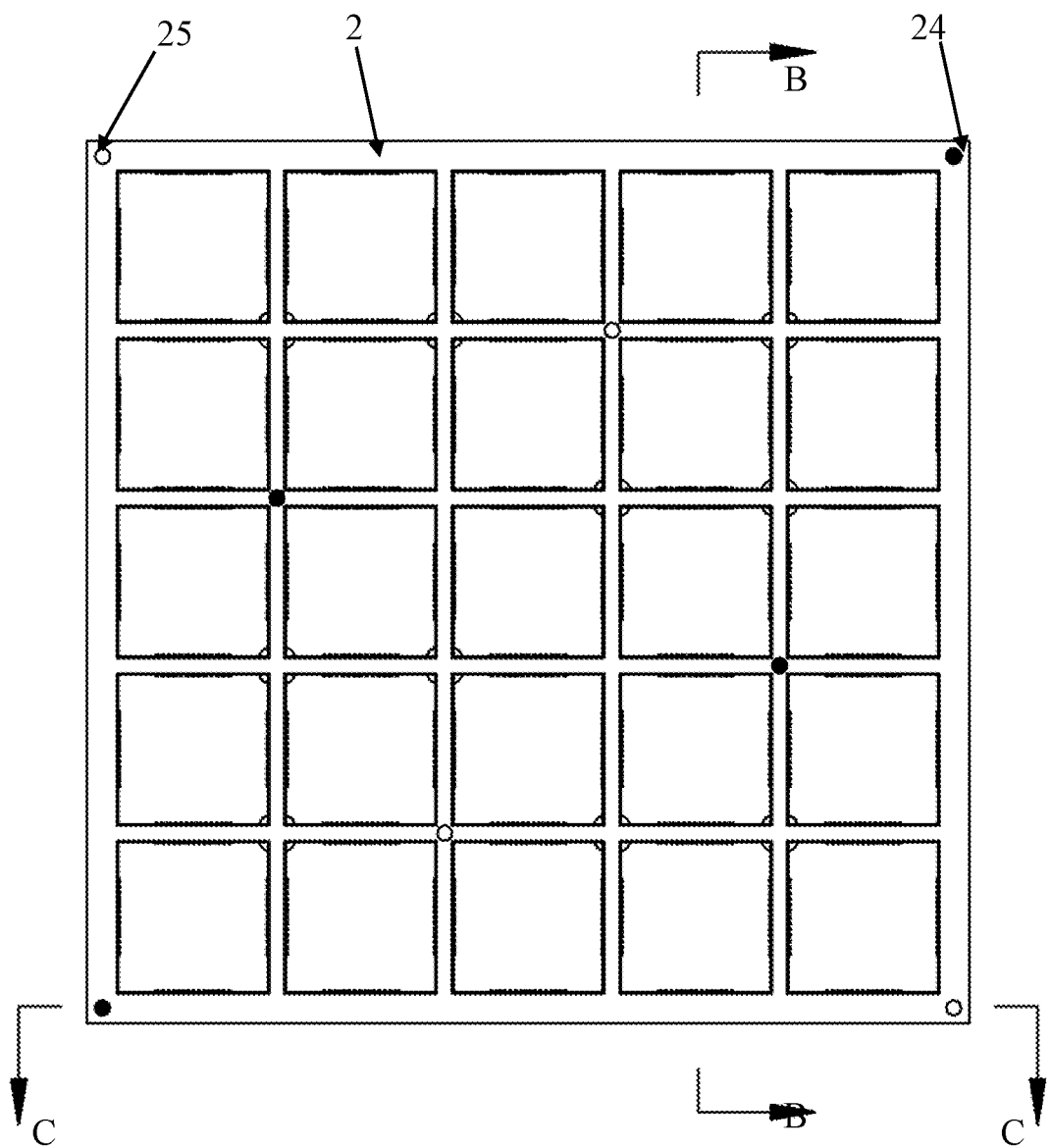
FIG. 3 is a schematic diagram showing a structure of a semi-cell of the present invention.
Figure 5:
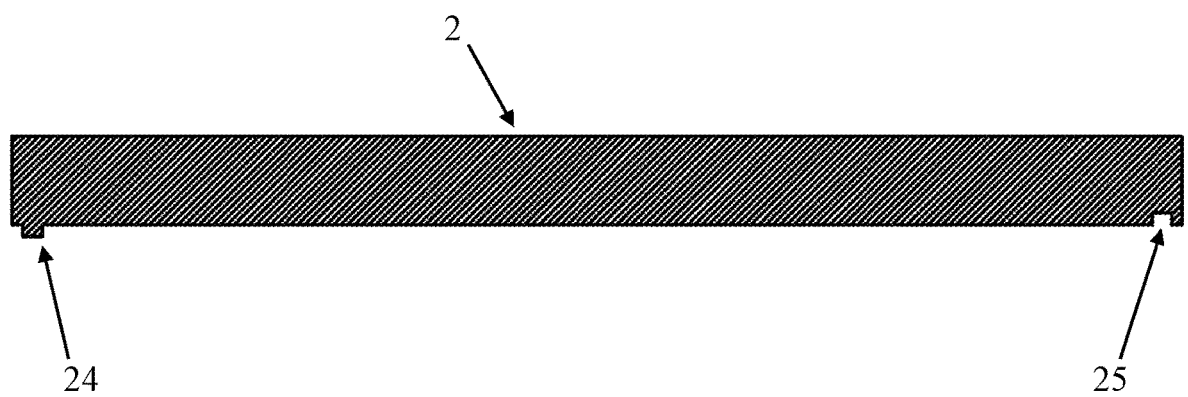
FIG. 5 is a sectional view taken along line C-C of FIG. 3.

Referring to FIGS. 3 and 5, a top surface of each of the semi-cells 2 is provided with protruding members 24 and locking grooves 25. Two semi-cells 2 are oppositely locked together after being buckled by the protruding members 24 and the locking grooves 25. Thus, the product has sufficient strength, friction and good aerodynamic performance. As shown in FIG. 3, each of the semi-cells is provided with four solid bosses as the protruding members 24 (male points) and four hollow circles (female points) as the locking grooves 25. The protruding members 24 and the locking grooves 25 are made integrally with the semi-cells. The protruding members 24 and the locking grooves 25 of the two semi-cells 2 are oppositely locked after being rotated 90 degrees. This locking manner can be realized by using only one mold, which saves the production cost.

The semi-cell 2 is made of an elastic expandable material, including one or more from the group consisting of elastic or non-elastic polyethylene or expanded polyethylene (PE/EPE), elastic or non-elastic polypropylene or expanded polypropylene (PP/EPP), non-elastic polystyrene or elastic expanded polystyrene (PS/EPS), elastic or non-elastic polyurethane (PU), elastic or non-elastic ethylene-vinyl acetate (EVA) copolymer, elastic or non-elastic urea formaldehyde (UF) plastic, and phenol formaldehyde (PF) resin.

The chemical catalysis module is prepared by the following steps:

1) An elastic expandable material is filled into a mold that is able to produce a target structure, molded at a preset temperature, and demolded to obtain the semi-cells 2.

In this step, the preset temperature may be an appropriate temperature or a melting point of the elastic expandable material.

2) One of the semi-cells 2 is placed upside down on a flat plate, and the adsorption cubes are embedded into the cavity structures of the one of the semi-cells 2 in a single or array manner until the positioning stoppers 22 are reached.

3) The other of the semi-cells 2 is placed on the top of the adsorption cubes of the one of the semi-cells 2 placed in step 2) by fitting the protruding members into the locking grooves, and the top semi-cell 2 is pressed down such that the two semi-cells 2 are oppositely locked to form the frame structure 1 with the adsorption cubes embedded.

An overall size of the prepared frame structure 1 is preferably 150 mm×150 mm to 900 mm×900 mm, and an overall thickness thereof is 22-900 mm.

In the present invention, the adsorption cubes are uniformly arranged in the cavity structures of each of the semi-cells 2 and the two semi-cells 2 are oppositely arranged to form the frame structure 1, thereby providing more airflow channels. The present invention avoids a gluing method that will produce a volatile organic compound (VOC), and limits the adsorption cubes in the frame structure 1, realizing desired compression resistance, shock resistance and crash resistance and making the product convenient for transportation.

The above describes the basic principles, essential features and advantages of the present invention. It should be understood by those skilled in the art that the present invention is not limited by the above embodiments. The above embodiments and the description only illustrate the principles of the present invention. Various changes and modifications may be made to the present invention without departing from the spirit and scope of the present invention, but such changes and modifications should fall within the claimed scope of the present invention. The protection scope of the present invention is defined by the appended claims and equivalents thereof

What is claimed is:

1. A chemical catalysis module, comprising adsorption cubes for adsorbing a chemical gas, wherein the chemical catalysis module further comprises a frame structure for accommodating the adsorption cubes; the frame structure comprises two semi-cells, wherein the two semi-cells are oppositely arranged; each of the two semi-cells is uniformly provided with a plurality of cavity structures; each of the plurality of cavity structures is embedded with the adsorption cubes inside; wherein
   the adsorption cubes are embedded in the each of the plurality of cavity structures in a single manner or an array manner;
   one half of the adsorption cubes are embedded in the plurality of cavity structures of a first one of the two semi-cells of the frame structure, and the other half of the adsorption cubes are embedded in the plurality of cavity structures of a second one of the two semi-cells of the frame structure.

2. The chemical catalysis module according to claim 1, wherein each of the plurality of cavity structures is provided with a circular cross section or a polygonal cross section.

3. The chemical catalysis module according to claim 1, wherein an inner wall of the each of the plurality of cavity structures is provided with protrusions for increasing friction; and
   the protrusions are made integrally with the two semi-cells.

4. The chemical catalysis module according to claim 1, wherein the each of the plurality of cavity structures is an open-top structure; positioning stoppers are provided on a bottom side of the each of the plurality of cavity structures to position the adsorption cubes.

5. The chemical catalysis module according to claim 1, wherein an inner edge of the each of the plurality of cavity structures adopts a chamfered structure.

6. The chemical catalysis module according to claim 1, wherein a top surface of the each of the two semi-cells is provided with protruding members and locking grooves, and the two semi-cells are oppositely locked together after being buckled by the protruding members and the locking grooves.

7. The chemical catalysis module according to claim 1, wherein the each of the two semi-cells is made of an elastic expandable material, and the elastic expandable material specifically comprises one or more of the following materials:
   elastic polyethylene (PE), non-elastic PE, elastic expanded polyethylene (EPE), non-elastic EPE, elastic polypropylene (PP), non-elastic PP, elastic expanded polypropylene (EPP), non-elastic EPP, elastic polystyrene (PS), non-elastic PS, elastic expanded polystyrene (EPS), non-elastic EPS, elastic polyurethane (PU), non-elastic PU, elastic ethylene-vinyl acetate (EVA) copolymer, non-elastic EVA copolymer, elastic urea formaldehyde (UF) plastic, non-elastic UF plastic, and phenol formaldehyde (PF) resin.

8. The chemical catalysis module according to claim 1, wherein each of the adsorption cubes is a multi-element mixed solid module using a ceramic matrix; the each of the adsorption cubes is a porous module, and a shape of pores in the each of the adsorption cubes comprises one or more from the group consisting of circle and polygons.

9. The chemical catalysis module according to claim 1, wherein the chemical catalysis module is prepared by the following steps:
   1) filling an elastic expandable material into a mold to obtain a first product, wherein the mold is able to produce a target structure, molding the first product at a predetermined temperature to obtain a second product, and demolding the second product to obtain the two semi-cells;
   2) placing the first one of the two semi-cells upside down on a flat plate, and embedding the adsorption cubes into the plurality of cavity structures of the first one of the two semi-cells in the single manner or the array manner until positioning stoppers are reached; and
   3) placing the second one of the two semi-cells on a top of the adsorption cubes of the first one of the two semi-cells placed in step 2) by fitting protruding members into locking grooves, and pressing down the second one of the two semi-cells to make the two semi-cells being oppositely locked.

10. The chemical catalysis module according to claim 2, wherein a top surface of the each of the two semi-cells is provided with protruding members and locking grooves, and the two semi-cells are oppositely locked together after being buckled by the protruding members and the locking grooves.

11. The chemical catalysis module according to claim 3, wherein a top surface of the each of the two semi-cells is provided with protruding members and locking grooves, and the two semi-cells are oppositely locked together after being buckled by the protruding members and the locking grooves.

12. The chemical catalysis module according to claim 4, wherein a top surface of the each of the two semi-cells is provided with protruding members and locking grooves, and the two semi-cells are oppositely locked together after being buckled by the protruding members and the locking grooves.

13. The chemical catalysis module according to claim 5, wherein a top surface of the each of the two semi-cells is provided with protruding members and locking grooves, and the two semi-cells are oppositely locked together after being buckled by the protruding members and the locking grooves.

* * * * *